United States Patent [19]

Fischer et al.

[11] 4,253,400
[45] Mar. 3, 1981

[54] RAILWAY HOPPER CAR SLIDING GATE CLOSING MECHANISM

[75] Inventors: Robert T. Fischer, Homewood, Ill.; William R. Shaver, Griffith, Ind.

[73] Assignee: Miner Enterprises, Inc., Geneva, Ill.

[21] Appl. No.: 48,370

[22] Filed: Jun. 14, 1979

[51] Int. Cl.³ .................. B61D 7/20; B61D 7/22; B61D 7/26

[52] U.S. Cl. .................. 105/282 P; 105/282 A; 105/304

[58] Field of Search ........... 105/282 R, 282 P, 282 A, 105/304

[56] References Cited

U.S. PATENT DOCUMENTS

| | | | |
|---|---|---|---|
| 2,386,702 | 10/1945 | McBride | 105/282 P |
| 3,127,852 | 4/1964 | Beauchamp | 105/282 P X |
| 3,224,382 | 12/1965 | Floehr | 105/282 P |
| 3,845,726 | 11/1974 | Fuller | 105/282 P |

Primary Examiner—Howard Beltran
Attorney, Agent, or Firm—Darbo & Vandenburgh

[57] ABSTRACT

When the slide gate of a hopper car is across the discharge opening and against the part of the frame that defines that opening, each of one pair of abutments below the gate and secured thereto is resting on a respective lever arm which lever arm is generally vertical and secured to the rototable shaft employed as a part of the mechanism for opening and closing of the gate. At the opposite side of the discharge opening from the shaft, the gate has another pair of downwardly facing abutments each of which then is resting on a respective generally vertically lever pivotally secured to the frame. As the gate is initially moved horizontally away from that position the lever arms pivot to permit the gate to descend. In addition to forming the downwardly facing abutments, the parts that form those abutments also form abutments which engage the lever and pivot it to an upright position as the gate is being closed.

3 Claims, 4 Drawing Figures

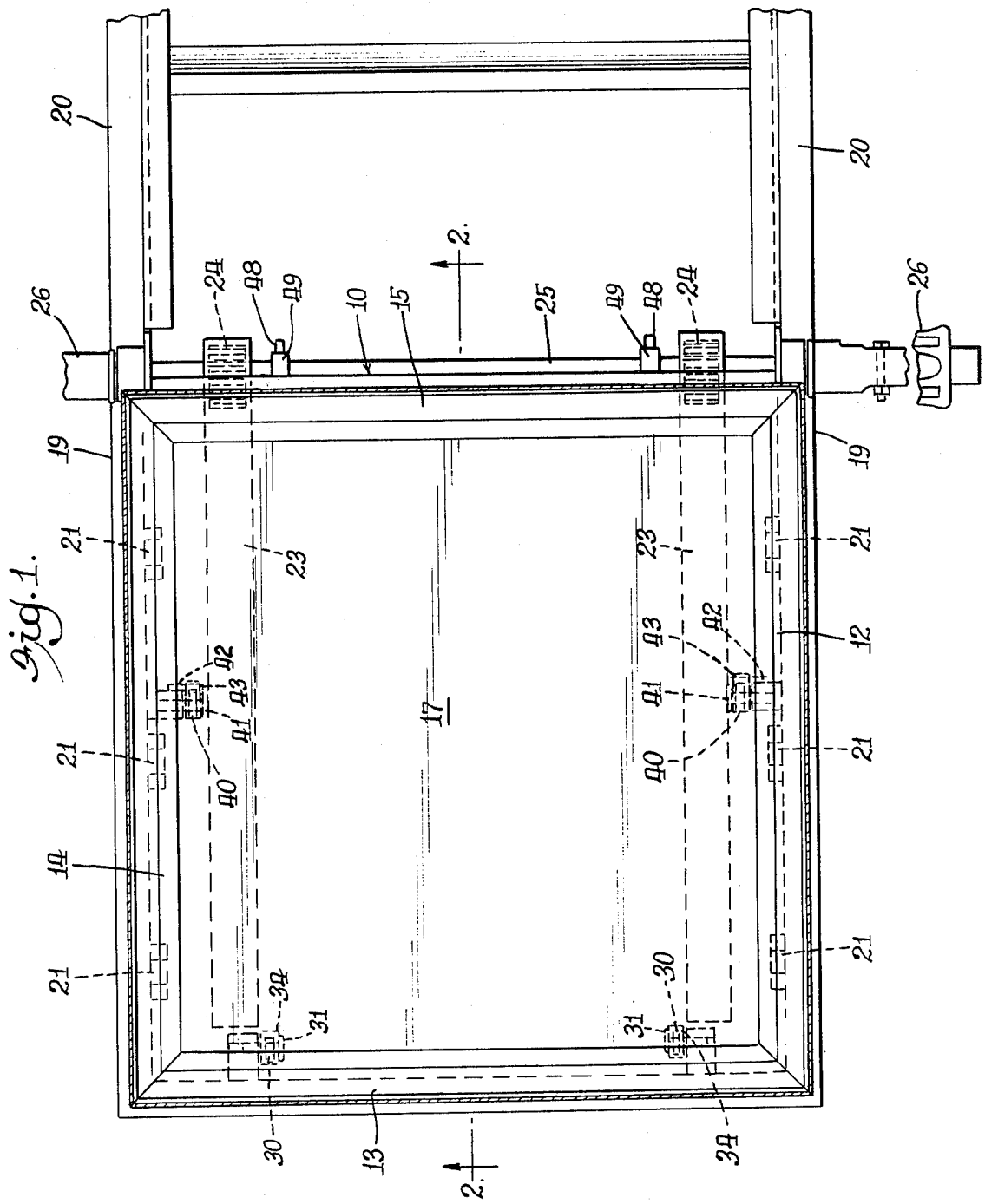

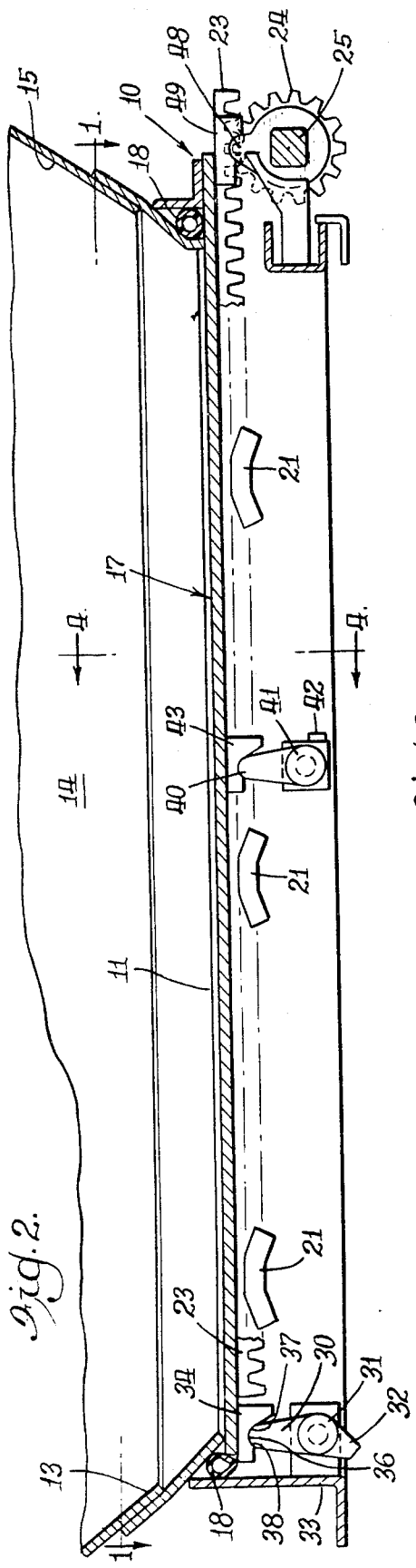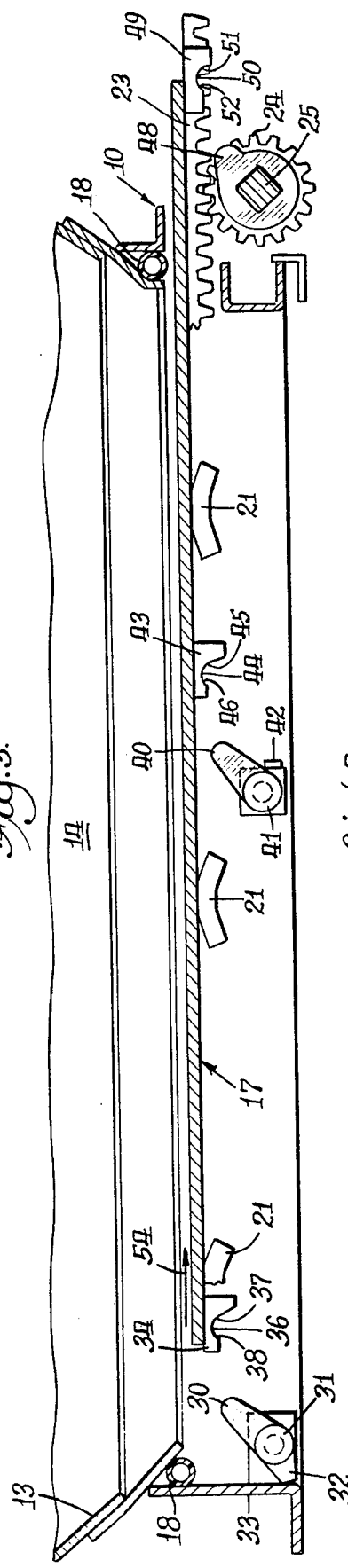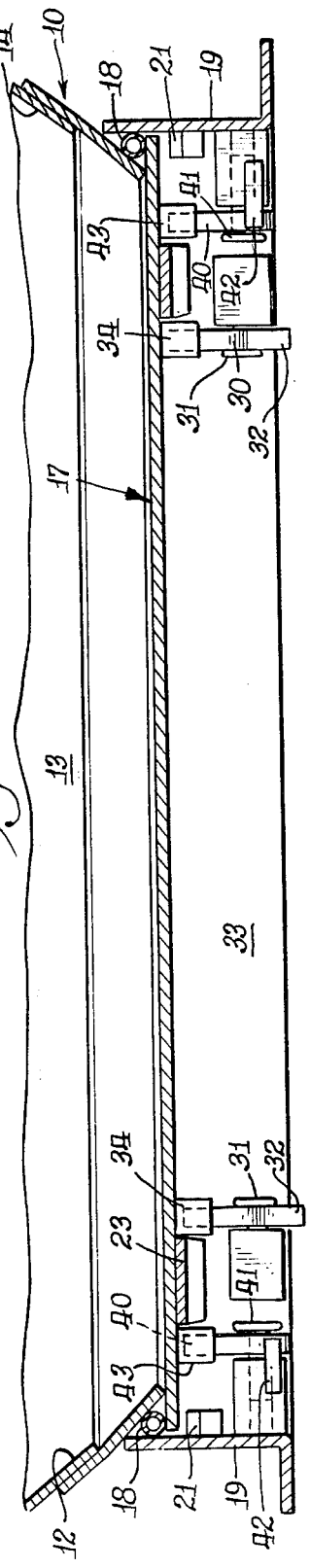

RAILWAY HOPPER CAR SLIDING GATE CLOSING MECHANISM

BACKGROUND AND SUMMARY OF THE INVENTION

The present invention pertains to an apparatus for holding a horizontal sliding gate against the frame defining the discharge opening of a railroad hopper car. When a hopper car is holding a fluidized lading such as fine particles of bauxite, bentonite, cement, flour, etc., problems are encountered with respect to that fluidized lading sifting between the gate and the frame even though the gate presumably is in the closed position. One solution has been to use gaskets of rubber or the like. If the gasket is to provide an effective seal it must be pressed securely against the gate, but this can interfere with the horizontal movement of the gate and/or result in excessive wear of the gasket. Thus various devices have been devised which will give the gate, in addition to its normal horizontal movement of opening and closing, a vertical movement when it is in the horizontal position below the opening. Thus such vertical movement acts to move the closed gate away from the gasket or the discharge opening so that the normal horizontal movement then can take place with less interference. Conversely, as the gate is moved to the closed position the final part of the movement includes at least a component which is vertical.

One device for such a vertical movement employs some blocks on the underside of the gate which move onto rollers as the gate approaches the closed position thereby raising the gate against the part of the frame defining the discharge opening (e.g., U.S. Pat. No. 3,845,726, issued Nov. 5, 1974). Such an apparatus has the problem that the gate is raised even before it reaches its final closed position, the result being that there still is horizontal movement after the gate has been raised. That is, while this solution reduces the portion of the opening movement during which the gate is raised, it does not eliminate it altogether. Another device employs fluid or mechanical pressure to lower and raise the gate before and after the horizontal movement of the gate takes place. Examples thereof are seen in U.S. Pat. No. 3,224,382, issued Dec. 21, 1965. In the mechanical pressure version, shafts along each side of the gate and parallel to the path of horizontal movement of the gate are rotated and as this is done protrusions on the shafts cam the shafts and gate upwardly. Such devices, however, add significantly to the apparatus required and thus to the overall cost, etc. Furthermore, they often necessitate two separate operations to move a gate to and away from the closed position, i.e., an operation to achieve the vertical movement as well as the normal operation to achieve the horizontal movement.

As compared to some such prior art devices, the present invention provides a vertical component of movement as a part of finally locating the gate in the closed position and in its initial movement away from the closed position. Thus the drag occasioned by the horizontal gate movement commences to be relieved almost immediately in the part of the gate movement away from the closed position and recommences only at the very final stage of the gate movement to the closed position. As compared to other prior art devices, the parts that must be added to the conventional gate structure in creating an embodiment of the invention are very nominal. Thus the added cost is relatively limited.

Embodiments of the invention do not require a second operation or manipulation. The normal horizontal actuation of the gate supplies the power to achieve the vertical movement. The invention employs pivoted lever arms which engage abutments on the bottom of the gate as the gate is moving in its final part of the horizontal movement toward the closed position with the levers pivoting to an upright position thereby lifting the gate against the bottom of the frame structure and gaskets, if any, surrounding the discharge opening.

Further objects and advantages will become apparent from the following description taken in conjunction with the drawings.

DESCRIPTION OF THE DRAWINGS

FIG. 1 is a plan view of a hopper discharge opening with the gate being held in place by an embodiment of the invention;

FIG. 2 is a section seen at line 2—2 of FIG. 1, with the gate in the closed position;

FIG. 3 is a view similar to that of FIG. 2, but with the gate partially open; and FIG. 4 is a section as seen at line 4—4 of FIG. 2.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

The drawings illustrate that part of the frame, generally 10, of a railway hopper car about the discharge opening 11. At this point the frame has four sloping sides 12–15 which actually define the opening 11 and which provide a chute through which the lading of the car can be discharged through the opening. A gate, generally 17, is used to close the opening. Gaskets 18 may be employed to achieve a better seal when the gate is in the closed position of FIG. 2. The frame has sides 19 and 20 which define a path or way along which the gate moves between the open and closed position. Affixed to the sides 19 are supports 21 on which the gate rests and slides during its horizontal movement. Along the bottom of the gate are a pair of racks 23. These racks are engaged by pinions 24 secured to a shaft 25. Shaft 25 is positioned to the side of the opening 11 across which the gate moves during its horizontal movement and transversely to the path of movement and is suitably journaled in frame 10. A suitable opening and closing mechanism 26 is secured to the shaft for rotating the shaft to open or close the gate as desired. When the gate is in the fully opened position it is out to the right of that side of the opening defined by side 15, as viewed in FIGS. 1 or 3.

As thus far described, the structure is conventional.

As a matter of reference, side 15 defines the side of the opening 11 across which the gate moves as it is traveling between the closed and open position. Below the opposite side (i.e., that defined by side 13) are a pair of pivoted lever arms or levers 30. These levers are journaled on pins 31 secured to frame 10. The pins define axes which are generally horizontal and transverse to the path of movement of the gate 17. The lever arms or levers have a tail piece 32 which is arranged to abut a portion 33 of frame 10. Thus the frame serves as a stop to limit the movement of the lever in a clockwise direction (as viewed in FIGS. 2 or 3) to the position of lever arm 30 in FIG. 3. For each of the lever arms or levers 30 the gate has a block 34 secured to the underside of the gate. The underside of each block is formed with a socket which is defined by three abutments. Thus there is a downwardly facing abutment 36, an abutment 37 facing away from side 15 and an abutment 38 facing toward side 15.

Below the gate and intermediate the sides 13 and 15 are a pair of lever arms or levers 40. These lever arms or levers are pivotally mounted on pins 41 secured to the frame 10. The pivotal axes are again generally horizontal and transverse to the path of movement of the gate. The frame includes a stop 42 for each lever arm to limit the downward pivotal movement to the position illustrated in FIG. 3. For each lever arm there is a respective block 43 secured to the underside of the gate. The bottom face of each of blocks 43 define a socket which includes three abutments 44-46 corresponding to abutments 36-38, respectively.

Below side 15 there are two lever arms or levers 48 which are secured to shaft 25 for rotation therewith. Cooperating with each of the lever arms or levers is a block 49 secured to the underside of gate 17. Like the previous blocks, each block 49 has a downwardly facing socket defined by three abutments 50-52 corresponding to abutments 36-38, respectively.

FIGS. 1 and 2 illustrate the gate in the fully closed position. It is up against the bottom edges of sides 12-15 about the opening 11. The gaskets 18 about the opening are compressed by the gate. The rounded distal ends of the lever arms or levers 30, 40, 48 form noses which bear against the downwardly facing abutments 36, 44, 50, respectively, to hold the gate in this raised position. Now assuming that the gate is to be moved to its open position, shaft 25 is rotated in a clockwise direction as viewed in FIGS. 2 and 3. This rotation causes lever arms or levers 48 to bear against the side facing abutments 51 and the pinion 24 to bear against rack 23 forcing the gate to the right in FIGS. 1-3. As the gate so moves, side facing abutments 38 and 46 bear against the nose ends of lever arms or levers 30 and 40, respectively, in a sense such as to pivot those levers clockwise as viewed in FIGS. 2 and 3. The pivotal movement of the lever arms or levers 30, 40, 48 cause the distal ends of those lever arms or levers to descend almost immediately thus allowing the gate to move downwardly away from the gaskets 18 and the bottom edges of the sides 12-15. Continued movement of the gate in the opening direction (i.e., as indicated by arrow 54) results in the continued downward movement of the levers until the gate rests upon supports 21. The levers are free to rotate to the FIG. 3 position at which they are arrested by the respective stops with the distal ends of the levers being below the gate and below the lower ends of side facing abutments 38 and 46. The gate is then moved to the fully opened position in the conventional manner.

Assuming that the gate is to be closed from the opened position, the shaft 25 is rotated counterclockwise. This causes the gate to move in the reverse of arrow 54. As the gate approaches the position at which it will be completely below opening 11, the abutments 38 and 46 pass across the tops of the lever arms but the abutments 37, 45 which face away from side 15 are below the distal ends of the lever arms or levers 30, 40, respectively, and are thus positioned to contact the levers adjacent their distal ends. Thus with continued movement of the gate to the left in FIG. 3 the abutments 37, 45 cause the lever arms or levers 30, 40, respectively, to pivot in a counterclockwise direction. As this occurs the distal ends of the lever arms or levers rise to a higher elevation thus lifting the gate. Of course, during the final closing of the gates the lever arms or levers 48 will have moved into the sockets on the bottoms of blocks 49 and will have similarly been raising the trailing part of the gate. Ultimately the gate is raised to the closed position of FIG. 2.

While I prefer to have the lever arms or levers 48 (below side 15) mounted on the shaft 25, embodiments could be constructed in which the levers are pivoted separately as are lever arms or levers 30 and 40. Any such modification should retain the characteristic of the disclosed embodiment in that no two of the blocks 34, 43 and 49 travel in a common path as the gate is moved, i.e., they are at different distances from the top and bottom edges of the gate as it is viewed in FIG. 1.

Some hopper cars may have gates that are not truly horizontal but may have some degree of pitch. Of course, the present invention is usable therewith and the term "generally horizontal" as employed herein is used loosely to be applicable to such inconsequential variations.

I claim:

1. A gate lifting apparatus for use with a hopper car wherein there is a frame having a part defining a discharge opening, a slide gate for opening and closing said opening, said frame having means associated with the gate and shifting the gate for movement along a generally horizontal path between a first position generally outboard of one side of said frame and away from said opening and a second position at which said gate is below and across said opening, and means interconnecting the frame and gate for moving said gate between said positions, said gate lifting apparatus comprising means on the underside of said gate and means on frame, below said gate and pivotable about an axis for moving said gate to said second position in a generally vertical direction toward and away from said part and characterized by:

said pivotable means comprising a lever arm having a nose, said lever arm being pivotable between an upright generally vertical position and an inclined position at which the nose projects from said axis upwardly and toward the first position of the gate;

said frame including a stop which engages said lever arm when the lever is in said inclined position to prevent said lever from moving farther toward a horizontal position;

said means on said gate comprising three abutments one of which faces downwardly, a second of which faces generally toward said one side and the third of which faces generally away from said one side, said three abutments forming a downwardly facing socket, said second abutment being above said nose when said gate is in said path and said lever is in said inclined position, said third abutment extending downwardly to an elevation below the nose when said gate is in said path and said lever is in said inclined position;

whereby as said gate moves from said first to said second position said socket will first move into registry with said nose and then said third abutment will engage said lever arm to pivot said lever arm to said upright position thereby raising said gate, and as said gate starts to move away from the second position and toward the first position said second abutment engages said lever arm and pivots said lever arm from said upright to said inclined position thereby lowering the gate away from said part and into said generally horizontal path.

2. A gate lifting apparatus as set forth in claim 1 and wherein said means for moving the gate includes a shaft below said gate, adjacent said one side and journaled in said frame for rotation about a horizontal axis transverse to said path, when said gate is being moved toward said second position the shaft being rotated in a sense such that the top thereof moves in a direction toward the part of said frame opposite to said side, said apparatus being further characterized by:

another lever arm secured to said shaft for rotation therewith, said other lever arm projecting upwardly in a generally vertical direction when said gate is in said second position; and a member on said gate and defining a downwardly projecting socket in registry with and engaging said other lever arm when said gate is in said second position;

said member and said other lever arm being dimensioned to hold said gate up against said part when so engaged;

whereby with said other lever so projecting upwardly and so engaging the socket of the member and with said shaft then being rotated in the opposite of said direction, said other lever arm will pivot downwardly to lower said member and gate.

3. A gate lifting apparatus for use with a hopper car wherein there is a frame having a part defining a discharge opening, a slide gate for opening and closing said opening, said frame having means associated with the gate and shifting the gate for movement along a generally horizontal path between a first position generally outboard of one side of said frame and away from said opening and a second position at which said gate is below and across said opening, and means interconnecting the frame and gate for moving said gate between said positions and including a shaft below said gate, adjacent said one side and journaled in said frame for rotation about a horizontal axis transverse to said path, when said gate is being moved toward said second position the shaft being rotated in a sense such that the top thereof moves in a direction toward the part of said frame opposite to said side, said gate lifting apparatus comprising means on said gate and frame for moving said gate at said second position in a generally vertical direction toward and away from said part and characterized by:

a pair of first lever arms secured to said shaft and rotatable therewith, said lever arms being spaced apart along said one side, said lever arms being substantially vertical when said gate is at said second position;

a pair of second lever arms positioned below said path, adjacent said part of said frame opposite to said one side and spaced apart from each other, said second lever arms being secured to said frame for pivotal movement about respective axes, which are generally horizontal and transverse to said path, between substantially vertical positions and inclined positions at which each lever arm projects from its axis upwardly and toward said one side;

stop means for engaging said second lever arms when the lever arms are in said inclined position to prevent said lever arms from moving farther toward a horizontal position;

said gate including a pair of first parts on the underside thereof, extending below the gate and forming respective downwardly facing abutments, each of said parts being associated with a respective first lever arm and being positioned such that when the gate is in the second position and against the part defining said opening the abutment of the part is resting on the distal end of the respective first lever arm which at that time is in said substantially vertical position; and said gate including a pair of second parts each of which is associated with a respective second lever arm, each second part being on the underside of the gate, extending below the gate and forming a first downwardly facing abutment and a second abutment facing generally away from said side, each said second part being positioned such that when the gate is in the second position and against said part defining said opening the downwardly facing abutment thereof is resting on the distal end of the respective second lever arm and the second abutment thereof is abutting the side of the respective second lever that is most nearly adjacent to said one side of said frame, said second abutment extending downwardly below the distal end of the respective second lever arm when that lever arm is in said inclined position.

* * * * *